Patented July 5, 1949

2,475,161

UNITED STATES PATENT OFFICE 2,475,161

COPOLYMERS OF STYRENE AND BENZALPHTHALIMIDES

Herman Harry Szmant, Pittsburgh, Pa., assignor to Monsanto Chemical Company, St. Louis, Mo., a corporation of Delaware No Drawing. Application November 29, 1947, Serial No. 788,959

5 Claims. (Cl. 260—86)

This invention relates to the production of resinous compositions by cojoint polymerization of styrene and benzalphthalimides, and to the novel copolymers thereby produced.

Polystyrene is a valuable and useful article of commerce but its use is limited by its thermal instability. Accordingly, the primary purpose of this invention is to provide a modified polymer of styrene having improved physical and chemical characteristics. More specifically the purpose of this invention is to prepare new copolymers having high softening temperatures and high heat distortion points.

In accordance with this invention it has been found that if styrene is polymerized in the presence of benzalphthalimide having the structural formula:

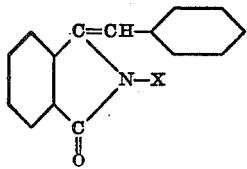

wherein X is a radical of the group consisting of hydrogen, alkyl and aryl, the thermal stability will be greater than in polystyrene prepared under the same conditions of polymerization.

The benzalphthalimides are prepared by the reaction of benzalphthalide with the corresponding amine at a temperature of 200°–220° C. The benzalphthalimides are obtained as crystalline products when recrystallized from acetone. By this method benzalphthalimide was prepared from benzalphthalide and ammonia in a 70 percent yield. The melting point of benzalphthalimide was 180–1° C.

The benzalphthalimides which are useful in the practice of this invention include the following compounds:

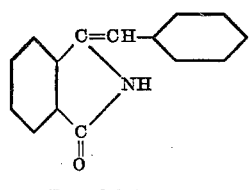

(Benzalphthalimide)

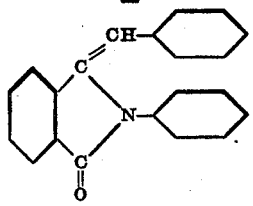

(N-phenyl-benzalphthalimide)

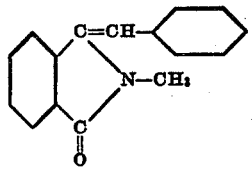

(N-methyl-benzalphthalimide)

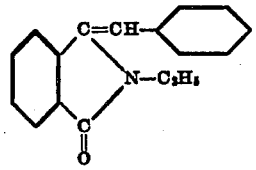

(N-ethyl-benzalphthalimide)

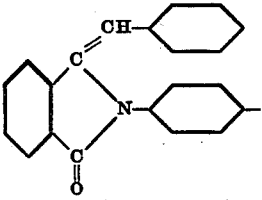

(N-(p-methyl)phenyl-benzalphthalimide)

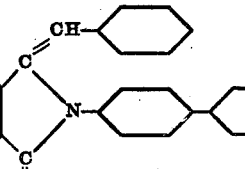

(N-(para-diphenyl)benzalphthalimide)

The new copolymers may be prepared by either the mass polymerization or the emulsion polymerization techniques. Generally from 2 to 50 percent by weight of a benzalphthalimide is copolymerized with 50 to 98 percent of styrene. The preferred copolymers are made by the copolymerization of 5 to 30 percent of a benzalphthalimide with 70 to 95 percent of styrene. In the mass polymerization which is usually used in fabricating useful copolymers, the monomer mixture in desired proportions is mixed with from 0.005 to 1.0 percent of an oxygen producing substance, such as benzoyl peroxide, hydrogen peroxide, acetyl peroxide, or other peroxide having in its structure a peroxide linkage (—O—O—). The rate of copolymerization will depend upon the temperature and upon the quantity and particular nature of the peroxy catalyst used. Generally from 2 to 200 hours are required but frequently longer periods of time may be used. It is generally desired to initiate the polymerization at a lower temperature and then gradually or periodically increasing the temperature. Under such circumstances temperatures below 100° C., are used in initiating the reaction and the copolymerization completed at temperatures between 175° C. and 200° C. The clear solid copolymer obtained by the mass polymerization technique is usually ground to particles of the desired size and used as a molding powder in the preparation of a wide variety of molded articles.

The emulsion polymerization technique is practiced in the conventional manner by charging the monomer and a substantial proportion of water to an agitating reactor. In addition to the usual peroxy or per-salt catalyst an emulsion stabilizing material, such as a rosin soap, a sodium alkyl sulfate, a sulfonated hydrocarbon or a salt of a high molecular weight fatty acid or a mixture thereof is used. In the practice of the emulsion technique the granular or finely divided polymer useful as a molding powder is obtained by drying the emulsion directly.

Further details in the preparation of the new copolymers are set forth in the following detailed example.

Example

A mixture of 90 percent styrene and 10 percent benzalphthalimide was mixed with 0.1 percent of benzoyl peroxide in a suitable container. The container was heated in an oven at 70° C. for 24 hours at which time the temperature was increased to 100° C. After a 2 day period at 100° C. the temperature was increased to 175° C. for 5 hours. Upon the completion of the polymerization a clear, solid copolymer was obtained. It was found to have an air bath heat distortion point at 93° C., whereas polystyrene prepared under identical conditions was found to have a heat distortion point of 78° C.

Although the invention has been described with respect to a specific example, it is not intended that the scope shall be limited by the details thereof, except to the extent incorporated in the following claims.

I claim:

1. A copolymer of 70 to 95 percent styrene and from 30 to 5 percent benzalphthalimide.
2. A copolymer of 70 to 95 percent styrene and from 30 to 5 percent N-methyl-benzalphthalimide.
3. A copolymer of 70 to 95 percent styrene and from 30 to 5 percent N-phenyl-benzalphthalimide.
4. A copolymer of 50 to 98 percent styrene and 50 to 2 percent of a compound having the structure:

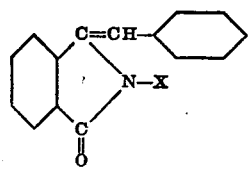

wherein X is a radical of the group consisting of hydrogen, methyl, phenyl, ethyl, biphenyl and methyl phenyl.

5. A method of preparing a copolymer which comprises mixing from 50 to 98 percent of styrene and from 50 to 2 percent of a compound having the structure:

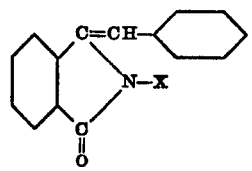

wherein X is a radical of the group consisting of hydrogen, methyl, phenyl, ethyl, biphenyl and methyl phenyl, and heating the mixture until a solid copolymer is obtained.

HERMAN HARRY SZMANT.

No references cited